United States Patent
Wang et al.

(10) Patent No.: US 10,614,621 B2
(45) Date of Patent: Apr. 7, 2020

(54) METHOD AND APPARATUS FOR PRESENTING INFORMATION

(71) Applicant: Baidu Online Network Technology (Beijing) Co., Ltd., Beijing (CN)

(72) Inventors: Lin Wang, Beijing (CN); Miao Yao, Beijing (CN); Yongjie Zhang, Beijing (CN)

(73) Assignee: Baidu Online Network Technology (Beijing) Co., Ltd, Beijing (CN)

(*) Notice: Subject to any disclaimer, the term of this patent is extended or adjusted under 35 U.S.C. 154(b) by 56 days.

(21) Appl. No.: 16/053,035

(22) Filed: Aug. 2, 2018

(65) Prior Publication Data

US 2019/0102938 A1  Apr. 4, 2019

(30) Foreign Application Priority Data

Sep. 29, 2017 (CN) .......................... 2017 1 0910122

(51) Int. Cl.
| | |
|---|---|
| G06T 17/05 | (2011.01) |
| G06T 19/00 | (2011.01) |
| G06T 7/73 | (2017.01) |
| G06F 16/9537 | (2019.01) |

(52) U.S. Cl.
CPC .......... *G06T 17/05* (2013.01); *G06F 16/9537* (2019.01); *G06T 7/75* (2017.01); *G06T 19/006* (2013.01)

(58) Field of Classification Search
CPC .......... G06T 17/05; G06T 19/006; G06T 7/75
USPC ........................................................ 382/103
See application file for complete search history.

(56) References Cited

U.S. PATENT DOCUMENTS

| | | | | |
|---|---|---|---|---|
| 2013/0063487 | A1* | 3/2013 | Spiegel ................. | G06T 11/00 345/633 |
| 2015/0193977 | A1* | 7/2015 | Johnson ................ | G06T 19/006 345/419 |
| 2017/0364082 | A1* | 12/2017 | Taieb .................... | G01C 21/32 |
| 2019/0230281 | A1* | 7/2019 | Ohba .................... | A63F 13/655 |

* cited by examiner

*Primary Examiner* — Congvan Tran
(74) *Attorney, Agent, or Firm* — Miller, Mathias & Hull LLP

(57) ABSTRACT

The present disclosure discloses a method and apparatus for presenting information. A specific implementation of the method comprises: receiving target geographic location information and a target environment image sent by a terminal; determining a target three-dimensional environment model associated with the target geographic location information based on the target geographic location information; identifying a target object image in the target environment image and generating a target object identifier; searching first target association information associated with the target object identifier from first association information stored in association with object identifiers based on the target object identifier; generating a to-be-presented three-dimensional environment model based on the first target association information and the target three-dimensional environment model; and sending the to-be-presented three-dimensional environment model to the terminal for the terminal to present the first target association information through an augmented reality based on the to-be-presented three-dimensional environment model.

12 Claims, 6 Drawing Sheets

METHOD AND APPARATUS FOR PRESENTING INFORMATION

CROSS-REFERENCE TO RELATED APPLICATIONS

This application claims priority to Chinese Application No. 201710910122.8, filed with the State Intellectual Property Office of the People's Republic of China (SIPO) on Sep. 29, 2017, the content of which is incorporated herein by reference in its entirety.

TECHNICAL FIELD

Embodiments of the present disclosure relate to the technical field of computers, specifically to the technical field of augmented reality, in particular to a method and apparatus for presenting information.

BACKGROUND

A user can use a terminal to request information from a server. Then, the server can send the information requested by the terminal to the terminal. After that, the terminal can present the information to the user through a screen.

The existing way of presenting information is usually to present two-dimensional plane information to users.

SUMMARY

It is an object of the embodiments of the present disclosure to provide a method and apparatus for presenting information.

In a first aspect, the embodiments of the present disclosure provide a method for presenting information, and the method includes: receiving target geographic location information and a target environment image sent by a terminal; determining a target three-dimensional environment model associated with the target geographic location information based on the target geographic location information; identifying a target object image in the target environment image and generating a target object identifier; searching first target association information associated with the target object identifier from first association information stored in association with object identifiers based on the target object identifier; generating a to-be-presented three-dimensional environment model based on the first target association information and the target three-dimensional environment model; and sending the to-be-presented three-dimensional environment model to the terminal for the terminal to present the first target association information through an augmented reality based on the to-be-presented three-dimensional environment model.

In a second aspect, the embodiments of the present disclosure provide an apparatus for presenting information, and the device includes: a first receiving unit, for receiving target geographic location information and a target environment image sent by a terminal; a determining unit, for determining a target three-dimensional environment model associated with the target geographic location information based on the target geographic location information; an identifying unit, for identifying a target object image in the target environment image and generating a target object identifier; a first searching unit, for searching first target association information associated with the target object identifier from first association information stored in association with object identifiers based on the target object identifier; a generating unit, for generating a to-be-presented three-dimensional environment model based on the first target association information and the target three-dimensional environment model; and a sending unit, for sending the to-be-presented three-dimensional environment model to the terminal for the terminal to present the first target association information through an augmented reality based on the to-be-presented three-dimensional environment model.

In a third aspect, the embodiments of the present disclosure provide a server, and the server includes: one or more processors, and a storage device for storing one or more programs, wherein when the one or more programs are executed by the one or more processors, the one or more processors implement the method in the first aspect.

In a fourth aspect, the embodiments of the present disclosure provide a computer readable storage medium on which computer programs are stored, and when the programs are executed by the processors, the method in the first aspect is implemented.

The method and apparatus for presenting information provided by the embodiments of the present disclosure, by receiving target geographic location information and a target environment image sent by a terminal, then determining a target three-dimensional environment model associated with the target geographic location information based on the target geographic location information, then identifying a target object image in the target environment image and generating a target object identifier, then searching first target association information associated with the target object identifier from first association information stored in association with object identifiers based on the target object identifier, then generating a to-be-presented three-dimensional environment model based on the first target association information and the target three-dimensional environment model, and then sending the to-be-presented three-dimensional environment model to the terminal, the terminal can present the first target association information through an augmented reality based on the to-be-presented three-dimensional environment model, thereby enriches the way of presenting information.

BRIEF DESCRIPTION OF THE DRAWINGS

Other features, objects and advantages of the present disclosure will become more apparent upon reading the detailed description to non-limiting embodiments with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
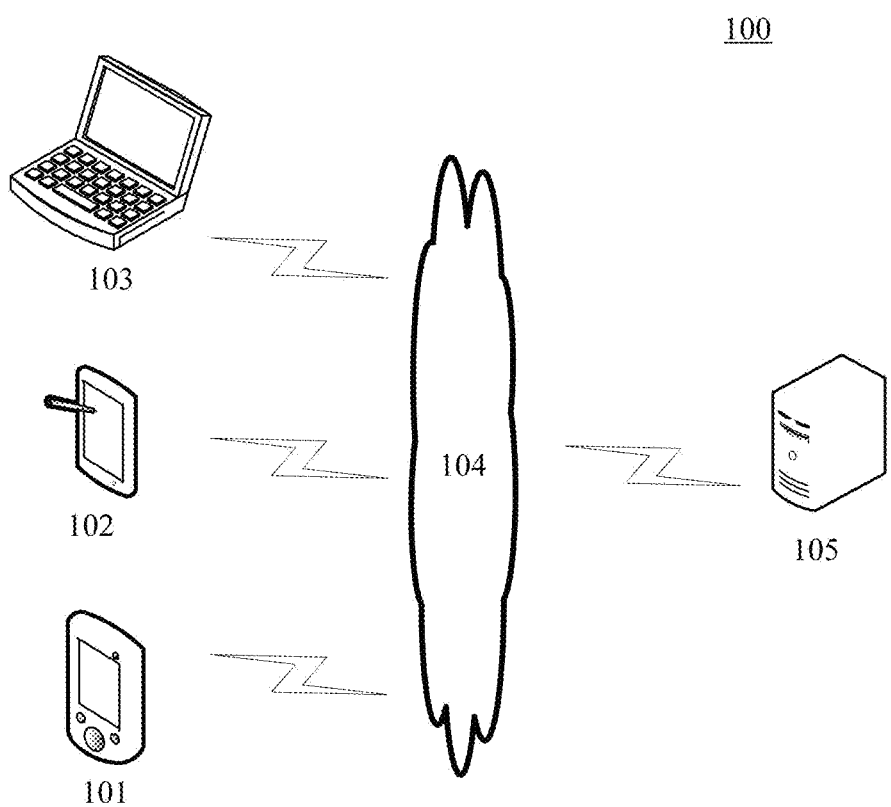
FIG. 1 is an architectural diagram of an exemplary system in which the present disclosure may be implemented.

FIG. 1 shows an exemplary architecture of a system 100 which may be used by an information presenting method or an information presenting apparatus according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as augmented reality applications, webpage browser applications, shopping applications, search applications, instant messaging tools, mailbox clients, and social platform software may be installed on the terminal devices 101, 102 and 103.

The terminal devices 101, 102 and 103 may be various electronic devices having a display screen and supporting an augmented reality function, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a back-end server supporting the augmented reality function on the terminal devices 101, 102 or 103. The back-end server may perform analyzing on the target geographical location information and other data processing, and return a processing result (for example, a to-be-presented three dimensional environment model) to the terminal devices.

It should be noted that the object data updating method according to the embodiments of the present disclosure is generally executed by the server 105. Accordingly, an object data updating apparatus is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
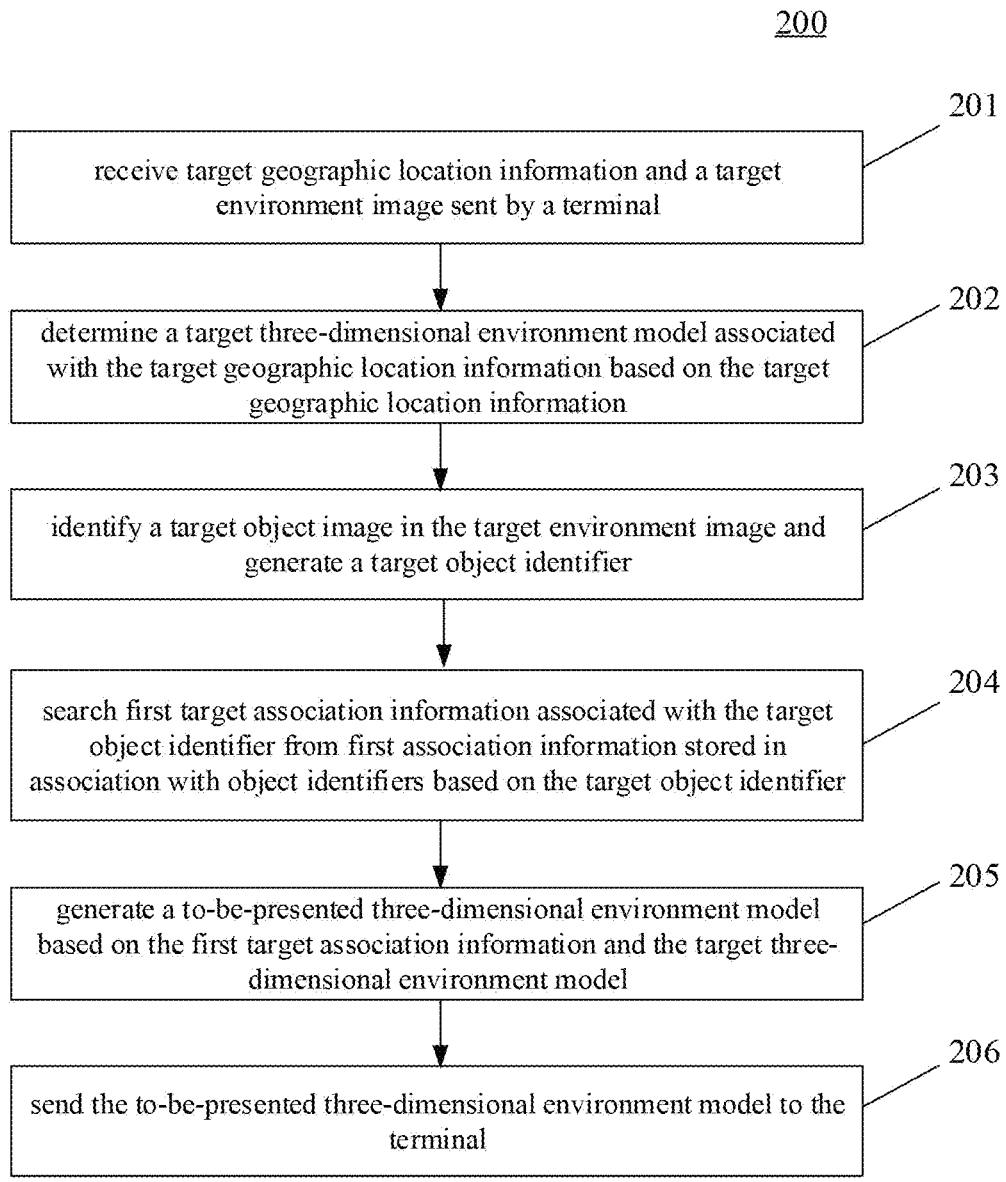
FIG. 2 is a flowchart of a method for presenting information according to an embodiment of the present disclosure.

Further referring to FIG. 2, it shows a flow 200 of the method for presenting information according to an embodiment of the present disclosure. The method for presenting information includes:

Step 201, receiving target geographic location information and a target environment image sent by a terminal.

In the present embodiment, an electronic device (for example, the server shown in FIG. 1) on which the method for presenting information runs can receive the target geographic location information and the target environment image sent by a terminal.

In the present embodiment, the terminal can be a terminal used by a user.

In the present embodiment, the target geographic location information may be the current geographic location information of the user or geographic location information that the user desires to query. The geographic location information may be latitude and longitude information of the terminal, or other information indicating information, for example, geographic interest point information.

In the present embodiment, the target environment image may be an image of the environment in which the user is currently located, or it may not be the image of the environment in which the user is currently located.

Step 202, determining a target three-dimensional environment model associated with the target geographic location information based on the target geographic location information.

In the present embodiment, the electronic device can determine the target three-dimensional environment model associated with the target geographic location information based on the target geographic location information.

In the present embodiment, an environment indicated by the target three-dimensional environment model is an environment nearby the target geographic location.

In some optional implementations of the present embodiment, step 202 can be implemented by: searching the target three-dimensional environment model associated with the target geographic location information in a three-dimensional environment model set pre-stored in association with geographic location information based on the target geographic location information. The electronic device can pre-collect images of various geographic locations, then establish a three-dimensional environmental model for a certain area, and finally, store the geographic location information of this area and the three-dimensional environmental model in association.

It should be noted that the way of acquiring the three-dimensional environment model pre-established can improve the speed of determining the model, thus improving the overall speed of this process, making the speed of presenting information faster and realizing a smoother information presentation effect.

In some optional implementations of the present embodiment, step 202 can also be implemented by: searching an association environment image associated with the target geographic location information in environment images pre-stored in association with geographic location information based on the target geographic location information; and establishing the target three-dimensional environment model based on the association environment image. The electronic device can receive environment images and geographic location information uploaded by other electronic devices from other electronic devices. Then, the environment images are stored in association with the geographic location information. The association environment image associated with the target geographic location information is searched when the target geographic location information is received. Finally, the target three-dimensional environment model is established by using a three-dimensional modeling technology based on the association environment images.

Step 203, identifying a target object image in the target environment image and generating a target object identifier.

In the present embodiment, the electronic device can identify the target object image in the target environment image and generate the target object identifier.

In the present embodiment, the target object image in the target environment image can be a main object in the target environment image.

It can be appreciated that the target object image can be identified by using an image identification algorithm.

As an example, the target environment image is an image of a car parked on a roadside. The image identification algorithm can identify the image of the car, and the image of the car is a target object image that reflects a theme of the target environment image.

In the present embodiment, the target object identifier may be information indicating an target object, such as a name of the target object.

In the present embodiment, by identifying a target object image, information about what the object is can be acquired, and thus the target object identifier can be generated.

Step 204, searching first target association information associated with the target object identifier from first association information stored in association with object identifiers based on the target object identifier.

In the present embodiment, the electronic device can search the first target association information associated with the target object identifier from the first association information stored in association with the object identifiers based on the target object identifier.

In the present embodiment, the first target association information may be information related to the target object. As an example, the first target association information may be profile information of the target object, and may also be comment information on the target object published by other users.

Step 205, generating a to-be-presented three-dimensional environment model based on the first target association information and the target three-dimensional environment model.

In the present embodiment, the electronic device can generate the three-dimensional environment model to be presented based on the first target association information and the target three-dimensional environment model.

In the present embodiment, the to-be-presented three-dimensional environment model can be generated by superimposing the first association information into the target three-dimensional environment model.

In some optional implementations of the present embodiment, step 205 can be implemented by: determining target location information of a three-dimensional target object model in the target three-dimensional environment model, wherein the three-dimensional target object model is a three-dimensional model of a target object indicated by the target object identifier; and generating the to-be-presented three-dimensional environment model by superimposing the first target association information into the target three-dimensional environment model based on the target location information.

As an example, the target object is a roadside shop, the first target association information is evaluation information of the shop, and the three-dimensional target object model is a three-dimensional model of the shop. Here, the target location information of the three-dimensional model of the shop in the target three-dimensional environment model can be determined. Then, the evaluation information is superimposed at the target location information to generate the to-be-presented three-dimensional environment model.

It should be noted that determining the target location information of the three-dimensional target object model in the target three-dimensional environment model can be implemented by the following way: the model information of the target three-dimensional environment model can include the object identifier and the location information of the three-dimensional model of the object indicated by the object identifier. Thus, the target location information can be searched in the model information of the target three-dimensional environment model based on the target object identifier.

Determining the target location information of the three-dimensional target object model in the target three-dimensional environment model can be implemented by the following way: the model information of the target three-dimensional environment model can further include an object image. Thus, the target location information can be searched in the model information of the target three-dimensional environment model based on the target object image.

Step 206, sending the three-dimensional environment model to be presented to the terminal.

In the present embodiment, the electronic device can send the to-be-presented three-dimensional environment model to the terminal. Then, the terminal presents the first target association information through an augmented reality based on the to-be-presented three-dimensional environment model.

It should be noted that the terminal presents the first target association information through an augmented reality, which can be that the terminal renders the to-be-presented three-dimensional environment model in the terminal by using a three-dimensional model rendering technology, and then presents the three-dimensional environment model based on the pose of the terminal itself, so that the first target association information in the three-dimensional environment model can be presented. Here, if the target geographic location information is not the current geographic location information of the user, it is not necessary to base on the pose of the terminal.

Figure 3:
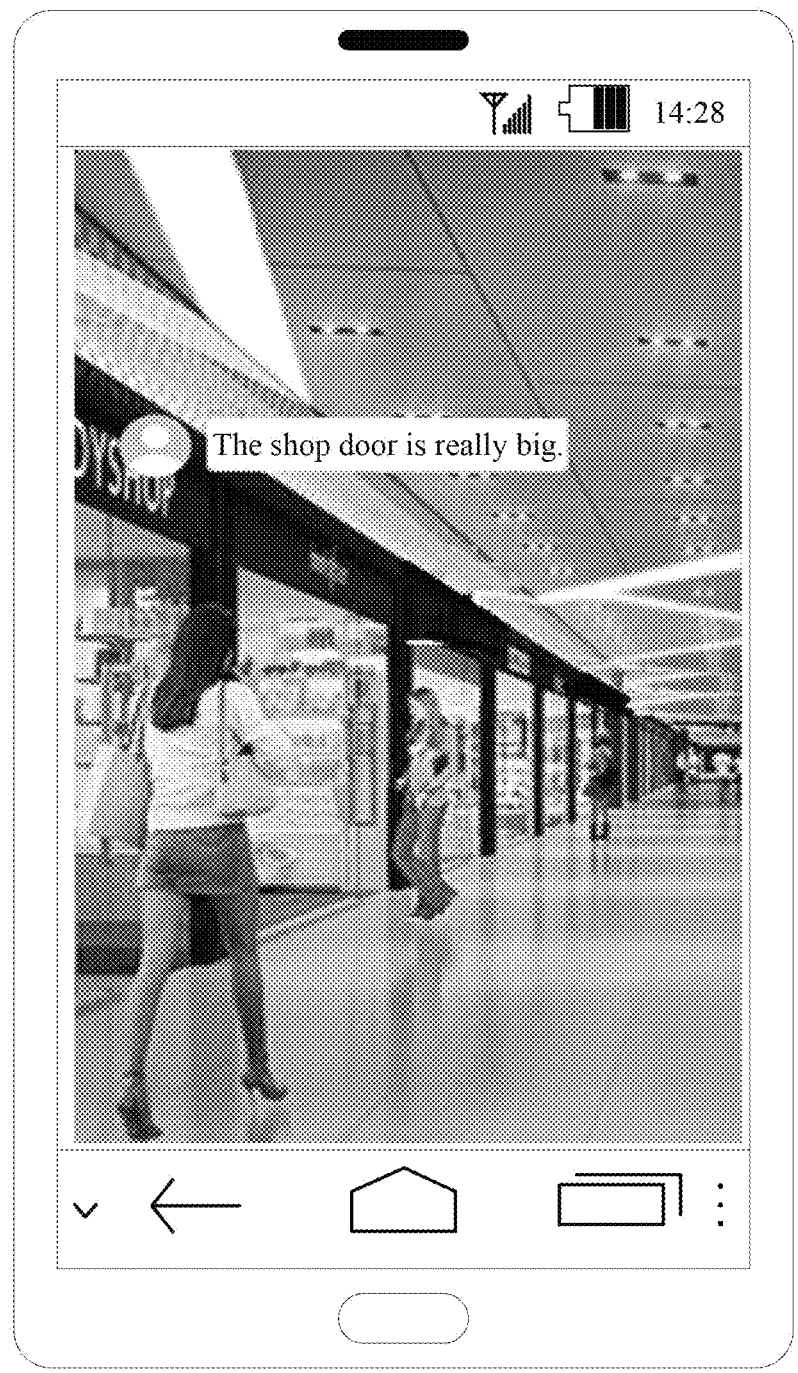
FIG. 3 is a schematic diagram of application disclosure scenario of the method for presenting information according to an embodiment of the present disclosure.

Further referring to FIG. 3, FIG. 3 is a schematic diagram of an application scenario of the method for presenting information according to the present embodiment. In the application scenario of FIG. 3, the user is shopping, and the terminal used by the user can send current location information and captured images of surrounding shops to the server. The server can determine the target three-dimensional environment model associated with the current location information based on the received current location information. The server can also identify a target object image in received images and generate a target object identifier, for example, a shop name. The server can search the first target association information associated with the target object identifier, for example, the evaluation information on the target object uploaded by other users, from the first association information stored in association with object identifiers based on the target object identifier. The server can generate the to-be-presented three-dimensional environment model based on the first target association information and the target three-dimensional environment model. The server can send the to-be-presented three-dimensional environment model to the terminal, and the terminal can present the first target association information through an augmented reality based on the to-be-presented three-dimensional environment model, for example, the image shown in FIG. 3 can be presented in a terminal screen of a user, and the image presents information "the shop door is really large" uploaded by the user through an augmented reality.

The method provided by the embodiments of the present disclosure, by receiving target geographic location information and a target environment image sent by a terminal, then determining a target three-dimensional environment model associated with the target geographic location information based on the target geographic location information, then identifying a target object image in the target environment image and generating a target object identifier, then searching first target association information associated with the target object identifier from first association information stored in association with object identifiers based on the target object identifier, then generating a to-be-presented three-dimensional environment model based on the first target association information and the target three-dimensional environment model, and then sending the to-be-presented three-dimensional environment model to the terminal, the terminal can present the first target association information through augmented reality based on the three-dimensional environment model to be presented, thereby enriches the way of presenting information.

Figure 4:
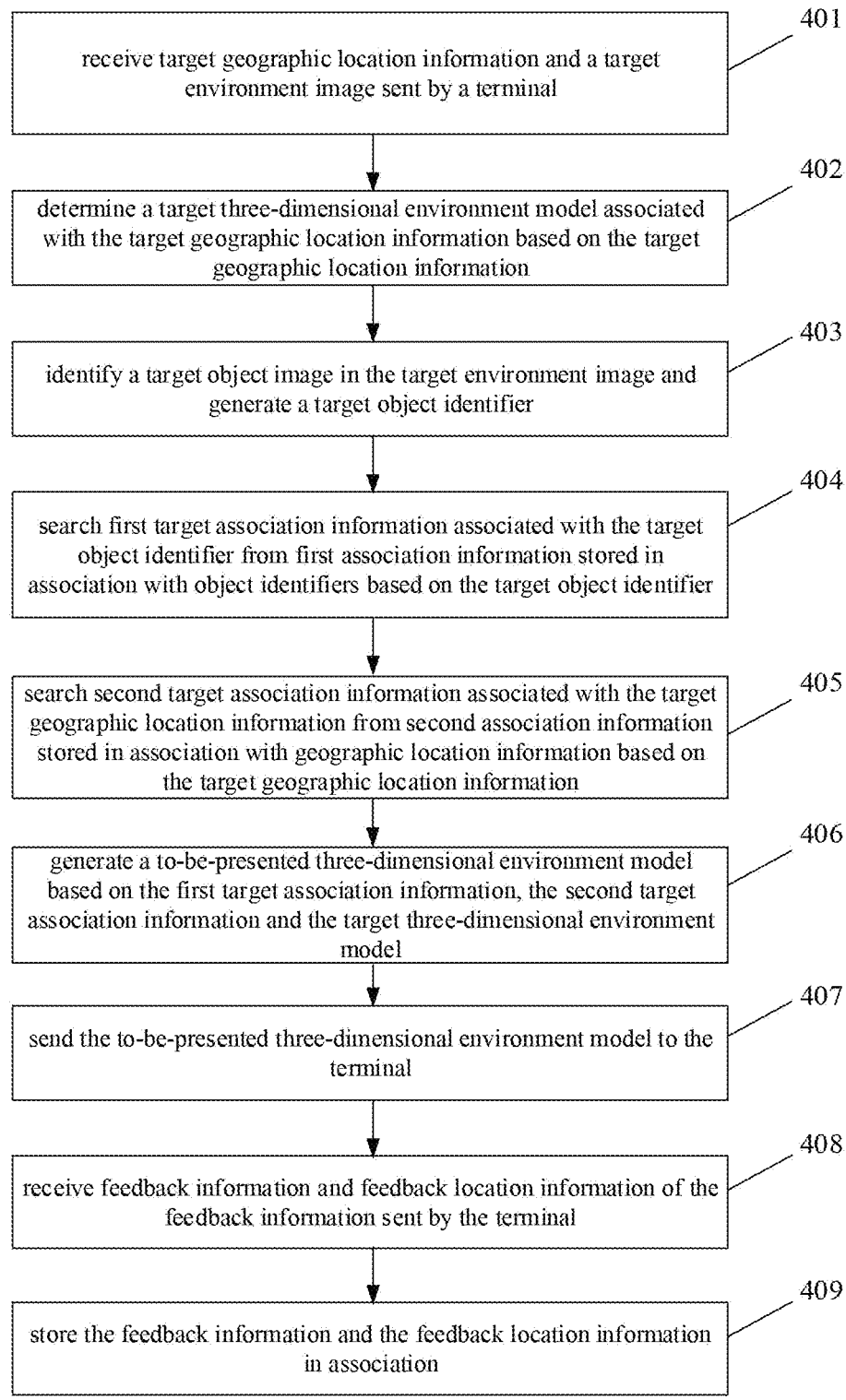
FIG. 4 is a flowchart of the method for presenting information according to another embodiment of the present disclosure.

Further referring to FIG. 4, it shows a flow 400 of the method for presenting information according to another embodiment. The flow 400 of the method for presenting information includes:

Step 401, receiving target geographic location information and a target environment image sent by a terminal.

In the present embodiment, an electronic device (for example, the server shown in FIG. 1) on which the method for presenting information runs can receive the target geographic location information and the target environment image sent by a terminal.

Step 402, determining a target three-dimensional environment model associated with the target geographic location information based on the target geographic location information.

In the present embodiment, the electronic device can determine the target three-dimensional environment model associated with the target geographic location information based on the target geographic location information.

Step 403, identifying a target object image in the target environment image and generating a target object identifier.

In the present embodiment, the electronic device can identify the target object image in the target environment image and generate the target object identifier.

Step 404, searching first target association information associated with the target object identifier from first association information stored in association with object identifiers based on the target object identifier.

In the present embodiment, the electronic device can search the first target association information associated with the target object identifier from the first association information stored in association with the object identifiers based on the target object identifier.

It should be noted that the implementations and technical effects of the steps 401, 402, 403 and 404 can refer to the descriptions in steps 201, 202, 203 and 204, and will not be repeated here.

Step 405, searching second target association information associated with the target geographic location information from second association information stored in association with geographic location information based on the target geographic location information.

In the present embodiment, the electronic device can search the second target association information associated with the target geographic location information from the second association information stored in association with the geographic location information based on the target geographic location information.

As an example, a user in Xiangshan of Beijing can acquire second association information related to Xiangshan, for example, "Xiangshan in autumn is really beautiful," "it's tiring to climb halfway up the hill," etc. uploaded by the user.

Step 406, generating a to-be-presented three-dimensional environment model based on the first target association information, the second target association information and the target three-dimensional environment model.

In the present embodiment, the electronic device can generate the to-be presented three-dimensional environment model based on the first target association information, the second target association information and the target three-dimensional environment model.

As an example, the to-be-presented three-dimensional environment model can be generated by superimposing the first target association information and the second target association information into the target three-dimensional environment model.

Step 407, sending the to-be-presented three-dimensional environment model to the terminal.

In the present embodiment, the electronic device can send the three-dimensional environment model to be presented, generated in step 406, to the terminal. Then, the terminal can present the first target association information and the second target association information in an augmented reality manner.

Step 408, receiving feedback information and feedback location information of the feedback information sent by the terminal.

In the present embodiment, the electronic device can receive feedback information and feedback location information of the feedback information sent by the terminal, and the feedback information is presented on the terminal through an augmented reality, wherein the feedback information is information fed back by the user aiming at at least one of the first association information or the second association information. Here, the feedback location information is used to indicate the model space location of the feedback information added by the user in the target three-dimensional environment model.

Step 409, storing the feedback information and the feedback location information in association.

In the present embodiment, the electronic device can store the feedback information and the model space location information in association.

In some optional implementations of the present embodiment, after the feedback information and the feedback location information are stored in association, when it is necessary to combine the feedback information in the target three-dimensional environment model, for example, when presentation requests of other users are received, the location to which the feedback information is added can be quickly determined, thereby improving the efficiency of presenting the target three-dimensional environment model together with the feedback information to other users.

It can be seen from FIG. 4 that compared with the embodiment corresponding to FIG. 2, the flow 400 of the method for presenting information in the present embodiment highlights the steps of presenting the second target association information and receiving the feedback information. Thus, the solution described in the present embodiment can introduce richer types of the presented information and ways of information presentation, and interactions among users can be realized by feeding back information.

Figure 5:
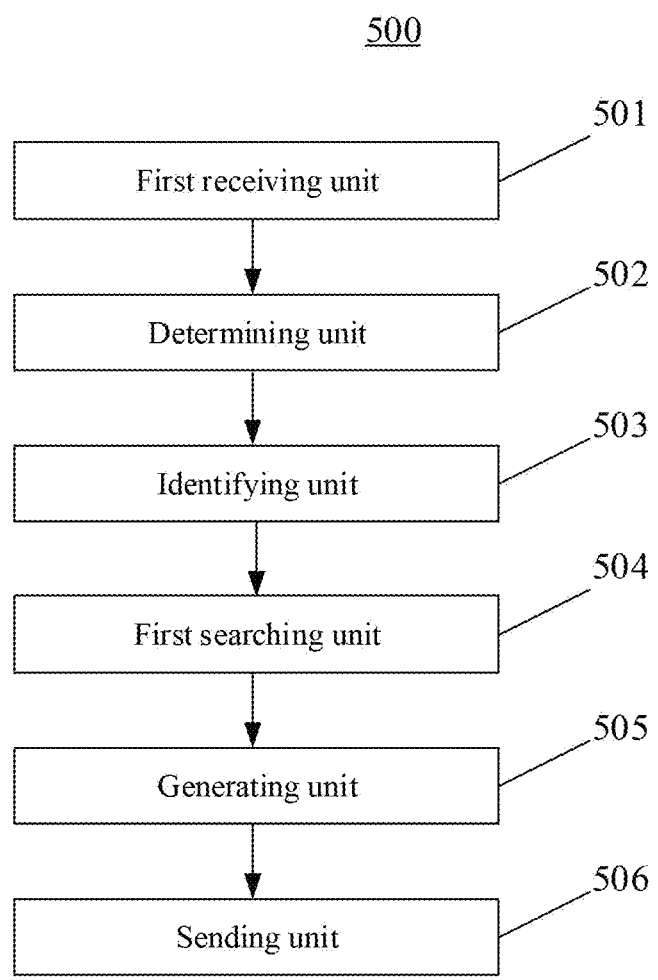
FIG. 5 is a structural diagram of an apparatus for presenting information according to an embodiment of the present disclosure.

Further referring to FIG. 5, as the implementation of the method shown in the above Figs., the present disclosure provides an embodiment of an apparatus for presenting information, the embodiment of the apparatus corresponds to the embodiment of the method shown in FIG. 2, and the device can be specifically applied to various types of electronic devices.

As shown in FIG. 5, the apparatus 500 for presenting information described in the present embodiment includes a first receiving unit 501, a determining unit 502, an identifying unit 503, a first searching unit 504, a generating unit 505 and a sending unit 506. The first receiving unit is used for receiving target geographic location information and a target environment image sent by a terminal; the determining unit is used for determining a target three-dimensional environment model associated with the target geographic location information based on the target geographic location information; the identifying unit is used for identifying a target object image in the target environment image and generating a target object identifier; the first searching unit is used for searching first target association information associated with the target object identifier from first association information stored in association with object identifiers based on the target object identifier; the generating unit is used for generating a to-be-presented three-dimensional environment model based on the first target association information and the target three-dimensional environment model; and the sending unit is used for sending the to-be-presented three-dimensional environment model to the terminal for the terminal to present the first target association information through an augmented reality based on the to-be-presented three-dimensional environment model.

In some optional implementations of the present embodiment, the apparatus further includes: a second searching unit (not shown), for searching second target association information associated with the target geographic location information from second association information stored in association with geographic location information based on the target geographic location information.

In some optional implementations of the present embodiment, the generating unit is further used for generating the to-be-presented three-dimensional environment model based on the first target association information, the second target association information and the target three-dimensional environment model; and the sending unit is further used for sending the to-be-presented three-dimensional environment model generated based on the first target association information, the second target association information and the target three-dimensional environment model to the terminal for the terminal to present the first target association information and the second target association information through an augmented reality.

In some optional implementations of the present embodiment, behind the sending unit, the apparatus further includes: a second receiving unit (not shown), for receiving feedback information and feedback location information of the feedback information sent by the terminal, wherein the feedback information is information fed back by a user aiming at at least one of the first association information or the second association information and is presented on the terminal through an augmented reality, and the feedback location information is used for indicating a model space location of feedback information added by the user in the target three-dimensional environment model; and a storage unit (not shown), for storing the feedback information and the feedback location information in association.

In some optional implementations of the present embodiment, the generating unit is further used for: determining target location information of a three-dimensional target object model in the target three-dimensional environment model, wherein the three-dimensional target object model is a model of a target object indicated by the target object identifier; and generating the to-be-presented three-dimensional environment model by superimposing the first target association information into the target three-dimensional environment model based on the target location information.

In some optional implementations of the present embodiment, the determining unit is further used for: searching the target three-dimensional environment model associated with the target geographic location information in a three-dimensional environment model set pre-stored in association with geographic location information based on the target geographic location information.

In some optional implementations of the present embodiment, the determining unit is further used for: searching an association environment image associated with the target geographic location information in environment images pre-stored in association with geographic location information based on the target geographic location information; and establishing the target three-dimensional environment model based on the association environment image.

In the present embodiment, the specific processing of the first receiving unit 501, the determining unit 502, the identifying unit 503, the first searching unit 504, the generating unit 505 and the sending unit 506 and the technical effects brought by them can refer to the related descriptions of steps 201, 202, 203, 204, 205 and 206 in the corresponding embodiment of FIG. 2 respectively, and will not be repeated here.

It should be noted that the implementation details and technical effects of each unit in the apparatus e for presenting information provided by the present embodiment can refer to the descriptions of other embodiments in the present disclosure, and will not be repeated here.

Figure 6:
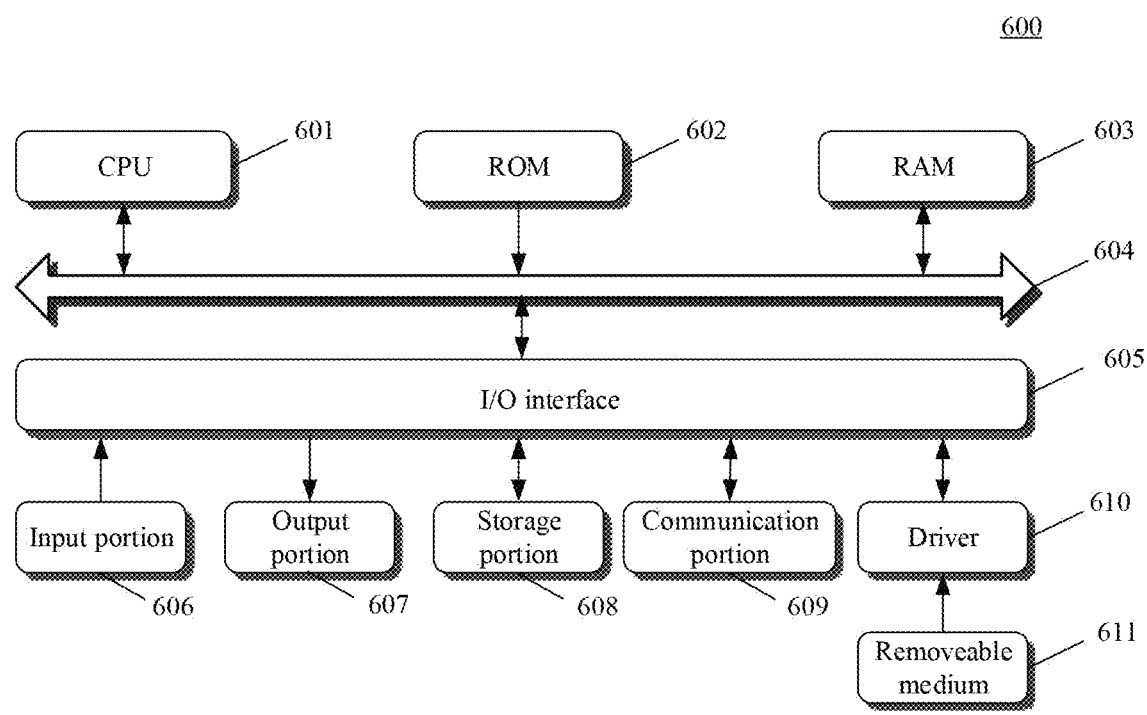
FIG. 6 is a structure diagram of a computer system of a server suitable for implementing the embodiments of the present disclosure.

Referring to FIG. 6, a schematic structural diagram of a computer system 600 of a server adapted to implement the embodiments of the present disclosure is shown. The server shown in FIG. 6 is merely an example and should not impose any restriction on the function and usage range of the embodiments according to the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion X08. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is embedded in a computer-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a first receiving unit, a determining unit, a identifying unit, a first searching unit, a generation unit and a sending unit, where the names of these units or modules do not in some cases constitute a limitation to such units or modules themselves. For example, the first receiving unit may also be described as "a unit for receiving.

as another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by an apparatus, cause the apparatus to: receive target geographic location information and a target environment image sent by a terminal; determine a target three-dimensional environment model associated with the target geographic location information based on the target geographic location information; identify a target object image in the target environment image and generating a target object identifier; search first target association information associated with the target object identifier from first association information stored in association with object identifiers based on the target object identifier; generate a to-be-presented three-dimensional environment model based on the first target association information and the target three-dimensional environment model; and send the to-be-presented three-dimensional environment model to the terminal for the terminal to present the first target association information through an augmented reality based on the to-be-presented three-dimensional environment model.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for presenting information, the method comprising:

receiving target geographic location information and a target environment image sent by a terminal;

determining a target three-dimensional environment model associated with the target geographic location information based on the target geographic location information;

identifying a target object image in the target environment image and generating a target object identifier;

searching first target association information associated with the target object identifier from first association information stored in association with object identifiers based on the target object identifier;

generating a to-be-presented three-dimensional environment model based on the first target association information and the target three-dimensional environment model; and sending the to-be-presented three-dimensional environment model to the terminal for the terminal to present the first target association information through an augmented reality based on the to-be-presented three-dimensional environment model.

2. The method according to claim 1, the method further comprising:

searching second target association information associated with the target geographic location information from second association information stored in association with geographic location information based on the target geographic location information.

3. The method according to claim 2, wherein the generating the to-be-presented three-dimensional environment model based on the first target association information and the target three-dimensional environment model comprises:

generating the to-be-presented three-dimensional environment model based on the first target association information, the second target association information and the target three-dimensional environment model; and the sending the to-be-presented three-dimensional environment model to the terminal comprises:

sending the to-be-presented three-dimensional environment model generated based on the first target association information, the second target association information and the target three-dimensional environment model to the terminal for the terminal to present the first target association information and the second target association information through the augmented reality.

4. The method according to claim 3, wherein after sending the to-be-presented three-dimensional environment model generated based on the first target association information, the second target association information and the target three-dimensional environment model to the terminal, the method further comprises:

receiving feedback information and feedback location information of the feedback information sent by the terminal, wherein the feedback information is information fed back by a user aiming at at least one of the first association information or the second association information and is presented on the terminal through the augmented reality, and the feedback location information is used for indicating a model space location of the feedback information added by the user in the target three-dimensional environment model; and storing the feedback information and the feedback location information in association.

5. The method according to claim 1, wherein the generating the to-be-presented three-dimensional environment model based on the first target association information and the target three-dimensional environment model comprises:

determining target location information of a three-dimensional target object model in the target three-dimensional environment model, wherein the three-dimensional target object model is a three-dimensional model of a target object indicated by the target object identifier; and generating the to-be-presented three-dimensional environment model by superimposing the first target association information into the target three-dimensional environment model based on the target location information.

6. The method according to claim 5, wherein the determining the target three-dimensional environment model associated with the target geographic location information based on the target geographic location information comprises:

searching the target three-dimensional environment model associated with the target geographic location information in a three-dimensional environment model set pre-stored in association with geographic location information based on the target geographic location information.

7. The method according to claim 5, wherein the determining the target three-dimensional environment model associated with the target geographic location information based on the target geographic location information comprises:

searching an association environment image associated with the target geographic location information from environment images pre-stored in association with geographic location information based on the target geographic location information; and establishing the target three-dimensional environment model based on the association environment image.

8. An apparatus for presenting information, the apparatus comprising:

at least one processor; and a memory storing instructions, the instructions when executed by the at least one processor, cause the at least one processor to perform operations, the operations comprising:

receiving target geographic location information and a target environment image sent by a terminal;

determining a target three-dimensional environment model associated with the target geographic location information based on the target geographic location information;

identifying a target object image in the target environment image and generating a target object identifier;

searching first target association information associated with the target object identifier from first association information stored in association with object identifiers based on the target object identifier;

generating a to-be-presented three-dimensional environment model based on the first target association information and the target three-dimensional environment model; and sending the to-be-presented three-dimensional environment model to the terminal for the terminal to present the first target association information through an augmented reality based on the to-be-presented three-dimensional environment model.

9. The apparatus according to claim 8, the operations further comprising:

searching second target association information associated with the target geographic location information from second association information stored in association with geographic location information based on the target geographic location information.

10. The apparatus according to claim 9, wherein the generating the to-be-presented three-dimensional environment model based on the first target association information and the target three-dimensional environment model comprises:

generating the to-be-presented three-dimensional environment model based on the first target association information, the second target association information and the target three-dimensional environment model; and the sending the to-be-presented three-dimensional environment model to the terminal comprises:

sending the to-be-presented three-dimensional environment model generated based on the first target association information, the second target association information and the target three-dimensional environment model to the terminal for the terminal to present the first target association information and the second target association information through the augmented reality.

11. The apparatus according to claim 10, wherein after sending the to-be-presented three-dimensional environment model generated based on the first target association information, the second target association information and the target three-dimensional environment model to the terminal, the operations further comprise:

receiving feedback information and feedback location information of the feedback information sent by the terminal, wherein the feedback information is information fed back by a user aiming at at least one of the first association information or the second association information, and the feedback location information is used for indicating a model space location of the feedback information added by the user in the target three-dimensional environment model; and storing the feedback information and the feedback location information in association.

12. A non-transitory computer readable storage medium, storing a computer program thereon, wherein the computer program, when executed by a processor, cause the processor to perform operations, the operations comprising:

receiving target geographic location information and a target environment image sent by a terminal;

determining a target three-dimensional environment model associated with the target geographic location information based on the target geographic location information;

identifying a target object image in the target environment image and generating a target object identifier;

searching first target association information associated with the target object identifier from first association information stored in association with object identifiers based on the target object identifier;

generating a to-be-presented three-dimensional environment model based on the first target association information and the target three-dimensional environment model; and sending the to-be-presented three-dimensional environment model to the terminal for the terminal to present the first target association information through an augmented reality based on the to-be-presented three-dimensional environment model.

* * * * *